US012134419B2

(12) United States Patent
Chen (10) Patent No.: US 12,134,419 B2
(45) Date of Patent: Nov. 5, 2024

(54) SEAT BAFFLE, BABY STROLLER AND BABY CARRIER

(71) Applicant: WONDERLAND SWITZERLAND AG, Steinhausen (CH)

(72) Inventor: Baozhong Chen, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/329,185

(22) Filed: May 25, 2021

(65) Prior Publication Data

US 2022/0234641 A1     Jul. 28, 2022

(30) Foreign Application Priority Data

Jan. 28, 2021   (CN) .......................... 202110122285.6

(51) Int. Cl.
*B62B 9/10*        (2006.01)
*A47D 13/02*       (2006.01)
(Continued)

(52) U.S. Cl.
CPC ............ *B62B 9/108* (2013.01); *A47D 13/027* (2022.08); *B62B 7/145* (2013.01); *B62B 9/12* (2013.01);
(Continued)

(58) Field of Classification Search
CPC ......... B62B 9/104; B62B 9/108; B62B 9/102; B62B 9/10; B62B 7/123; A47D 13/02;
(Continued)

(56) References Cited

U.S. PATENT DOCUMENTS 4,846,521 A * 7/1989 Takahashi ................. B62B 9/10
                                                    296/81
5,074,616 A * 12/1991 Smith ....................... A47C 7/66
                                                    297/184.13
(Continued)

FOREIGN PATENT DOCUMENTS

CN        1037307 A      11/1989
CN        2651111 Y      10/2004
(Continued)

OTHER PUBLICATIONS

1st Office Action issued to China counterpart application (application No. 202110122285.6) on Jun. 28, 2024.

*Primary Examiner* — Emma K Frick (57) ABSTRACT

A seat baffle and a baby stroller are introduced. The baby baffle is disposed in a baby carrier. The baby carrier includes a seat and a support rod erected relatively to the seat and straddling a front end of the seat, the seat baffle includes a baffle cloth, one end of the baffle cloth is fixed to the front end of the seat, the other end of the baffle cloth is detachably fixed to the support rod for shielding the front end of the main body. When the baffle cloth is fixed on the support rod, the front end of the main body is shielded, which is suitable for small babies; after the baffle cloth is detached from the support rod, the front end of the main body becomes open, which is suitable for large babies. The seat baffle can switch between two usage statuses in the baby carrier.

15 Claims, 12 Drawing Sheets

(51) Int. Cl.
*B62B 7/14* (2006.01)
*B62B 9/12* (2006.01)
*B62B 9/14* (2006.01)
*B62B 9/24* (2006.01)
*B62B 9/26* (2006.01)

(52) U.S. Cl.
CPC .............. B62B 9/142 (2013.01); B62B 9/245 (2013.01); B62B 9/26 (2013.01)

(58) Field of Classification Search
CPC ... A47D 13/025; A47D 13/027; A47D 13/029
See application file for complete search history.

(56) References Cited

U.S. PATENT DOCUMENTS

| | | | | |
|---|---|---|---|---|
| 5,201,535 A * | 4/1993 | Kato | .............. | B62B 7/123 297/229 |
| 5,803,535 A * | 9/1998 | Jane Cabagnero | ..... | B62B 7/123 297/184.13 |
| 5,954,404 A * | 9/1999 | Suzuki | .............. | B62B 9/10 297/219.12 |
| 6,019,421 A * | 2/2000 | Roh | .............. | A47D 15/00 297/184.13 |
| 6,517,153 B1 * | 2/2003 | Brewer | .............. | B60N 2/2845 297/184.13 |
| 6,669,225 B2 * | 12/2003 | Greger | .............. | B62B 9/24 280/658 |
| 6,877,761 B2 * | 4/2005 | Hsia | .............. | B62B 7/123 280/658 |
| 6,880,850 B2 * | 4/2005 | Hsia | .............. | B62B 9/104 280/658 |
| 7,431,395 B2 * | 10/2008 | Morgan | .............. | B62B 9/108 297/219.12 |
| 7,661,158 B2 * | 2/2010 | Daeseleire | .............. | A47D 13/027 5/655 |
| 8,550,548 B2 * | 10/2013 | Gibbons | .............. | B62B 9/142 297/184.13 |
| 9,049,946 B1 * | 6/2015 | Tyler | .............. | A47D 15/00 |
| 2003/0075903 A1 * | 4/2003 | Hsia | .............. | B60N 2/2845 280/647 |
| 2009/0114691 A1 * | 5/2009 | Bizzell | .............. | A47D 9/012 224/186 |
| 2010/0072793 A1 * | 3/2010 | Kress | .............. | A47D 13/027 297/184.13 |
| 2014/0224578 A1 * | 8/2014 | Blankenship | .............. | G10K 11/162 181/290 |
| 2016/0347220 A1 * | 12/2016 | Brown | .............. | B60N 2/58 |
| 2019/0135323 A1 | 5/2019 | Avigdor et al. | | |

FOREIGN PATENT DOCUMENTS

| | | | | | |
|---|---|---|---|---|---|
| CN | 103373385 A | | 10/2013 | | |
| CN | 209833739 U | | 12/2019 | | |
| CN | 216301200 U | * | 4/2022 | ............ | B62B 3/002 |
| DE | 4305548 A1 | * | 8/1994 | ............ | A47D 13/02 |
| FR | 2740419 A1 | * | 4/1997 | ............ | A47D 13/02 |
| FR | 2920735 A1 | * | 3/2009 | ............ | B62B 9/108 |
| GB | 2324510 A | * | 10/1998 | ............ | B62B 7/08 |
| GB | 2405380 A | * | 3/2005 | ............ | B62B 9/104 |
| JP | H0228059 A | * | 1/1990 | | |
| JP | 2006001482 A | | 1/2006 | | |
| JP | 2019131111 A | | 8/2019 | | |
| KR | 20200057619 A | * | 5/2020 | | |

* cited by examiner

SEAT BAFFLE, BABY STROLLER AND BABY CARRIER

CROSS-REFERENCE TO RELATED APPLICATION

This non-provisional application claims priority under 35 U.S.C. § 119(a) on Patent Application No(s). 202110122285.6 filed in China on Jan. 28, 2021, the entire contents of which are hereby incorporated by reference.

BACKGROUND OF THE INVENTION

1. Field of the Invention

The present disclosure relates to a baby stroller, and in particular to a removable seat baffle and a baby stroller and a baby carrier having the seat baffle.

2. Description of the Related Art

Generally, a baby stroller includes a frame and a baby carrier mounted on the frame, wherein the frame is a basic structure for supporting the baby carrier. Also, the frame can also be folded to reduce the size of the baby stroller to facilitate carrying and storage, and the baby carrier can enclose a safe and comfortable space for a baby to sit and lie in.

Conventionally, the baby carrier includes a seat for carrying a baby, side blocks on both sides of the seat, and a rear block at a rear end of the seat, wherein the end of the baby carrier opposite to the rear block is open. For kids with longer bodies, when sitting and lying in the baby carrier, the feet can extend from the front end of the baby carrier without being restricted, and the comfort can be guaranteed. However, for small babies, there may be a risk that the baby slips out of the front end of the baby carrier. Thus, in another structure of baby carriers, a seat baffle is disposed for covering the front end of the seat to safely restrict the baby in the baby carrier. In fact, the relevant laws and regulations of some countries also clearly require that the stroller and baby carrier used for babies younger than 6 months must be equipped with a seat baffle.

Therefore, the current baby strollers are divided into two types, with and without baffles. For families with babies, the stroller with the baffle is first used, and the stroller without the baffle is used when the baby is 6 months old or has a certain degree of physical development. For families with children of different ages, it is also necessary to have two types of strollers at the same time. In this case, it will increase the household's expense, and on the other hand, since baby strollers are often discarded after they are useless, it also causes waste of resources and pollution to the environment.

The above problems are all caused by the insufficient applicability of the stroller, i.e., the conventional strollers cannot be applied to both big and small babies. In order to solve the above problems, it is necessary to provide a stroller with high applicability and a baffle structure that is beneficial to improve the applicability of the stroller.

BRIEF SUMMARY OF THE INVENTION

It is an object of the present disclosure to provide a baffle structure for improve applicability of a stroller.

It is another object of the present disclosure to provide a stroller with high applicability.

It is another object of the present disclosure to provide a baby carrier having a baffle cloth for shielding when in use, and the baffle cloth can be stored when not in use.

In order to achieve the above objects, the present disclosure provides a seat baffle disposed in a baby carrier, wherein the baby carrier includes a seat and a support rod erected relatively to the seat and straddling a front end of the seat, the seat baffle includes a baffle cloth, which has one end connected to the front end of the seat and the other end detachably fixed to the support rod to cover the front end of the baby carrier.

In the present disclosure, the front end of the baby carrier is open, and the seat baffle is disposed on a front end of a main body, wherein one end of the baffle cloth is fixed to the seat, and the other end of the baffle cloth is detachably fixed to the support rod. When the baffle cloth is fixed on the support rod, the front end of the main body is shielded; at this time, the baby carrier is a completely restricted structure, which can be used for babies less than 6 months old or small in size. When the baffle cloth is detached from the support rod, the front end of the main body is not shielded by the baffle cloth and becomes open; at this time, the baby carrier is can be used for babies older than 6 months or big in size. In comparison with the conventional technologies, the seat baffle of the present disclosure can be switched between two usage statuses in the baby carrier, such that the baby carrier can be used for babies of different sizes, which is beneficial to improve the applicability of the stroller, and thus saves family consumption expenditure, reduces waste of resources, and reduces pollution to the environment.

Preferably, one end of the baffle cloth is fixed to a bottom surface of the front end of the seat.

Preferably, the seat includes a seat plate and a seat cloth sleeved on the seat plate, and one end of the baffle cloth is fixed to the seat cloth.

Specifically, the baffle cloth is sewn and fixed to the seat cloth.

Preferably, the baby carrier comprises a first connecting component, and the baffle cloth comprises a second connecting component for locking a position of the baffle cloth when the second connecting component is coupled with the first connecting component.

Specifically, the baby carrier further comprises side blocks disposed on both sides of the seat and a rear block fixed to a rear end of the seat, and the first connecting component is disposed on the side block.

Specifically, the first connecting component and the second connecting component are engaged with each other.

More specifically, the first connecting components and the second connecting components are a male button and a female button of press buttons.

Preferably, a storage bag is disposed at a bottom surface of the seat, and the baffle cloth is received into the storage bag after being separated from the support rod.

Specifically, a plurality of third connecting components are disposed on the baffle cloth, a plurality of fourth connecting components are disposed on the bottom surface of the seat, and the third connecting components and the fourth connecting components are engaged after the baffle cloth is received in the storage bag.

Specifically, the storage bag is a mesh structure made of an elastic material.

Preferably, the support rod is covered by one end of the baffle cloth.

Specifically, one end of the baffle cloth comprises a zipper, and the baffle cloth covers the support rod and is fixed to the support rod by the zipper.

Preferably, the support rod is detachably disposed across the front end of the seat.

In order to achieve another object, the present disclosure provides a baby stroller having a frame and a baby carrier disposed on the fame, wherein the baby carrier includes a main body and the above-mentioned seat baffle.

In comparison with the conventional technologies, the seat baffle can be switched between the two usage statues, i.e. shielding the front end of the baby carrier body and being removed, so that the baby stroller of the present disclosure can be applied to babies of different sizes.

Preferably, the frame includes two side bars, and the baby carrier is disposed between the two side bars.

Specifically, two ends of the support rod are detachably mounted on the two side bars, respectively.

A baby carrier includes a seat; and a baffle cloth for shielding an upper side of the seat, wherein the baffle cloth has one end fixed to a front end of the seat, and has the other end detachably disposed on a side surface of the seat, and wherein a storage bag is disposed at one side of the seat, and the baffle cloth is received in the storage bag after being detached from the seat.

Preferably, the storage bag is disposed at a front side of the seat.

Specifically, one end of the baffle cloth is detachably connected to the inside of the storage bag.

Preferably, a zipper is provided at an opening of the storage bag for closing or opening the storage bag.

Specifically, a shielding sheet is disposed at a side surface of the seat for shielding the zipper.

Preferably, the baffle cloth comprises a first connecting component and a second connecting component for locking a position of the baffle cloth when the second connecting component is coupled with the first connecting component.

Specifically, the baffle cloth comprises a webbing, and the second connecting component is disposed on the webbing.

Specifically, the first connecting components and the second connecting components are respectively a male button and a female button of press buttons.

Preferably, an edge of the baffle cloth is provided with an elastic band to prevent the edge of the baffle cloth from turning outward.

DETAILED DESCRIPTION OF THE INVENTION

The following is a detailed description in conjunction with the preferred embodiments and the accompanying drawings.

Figure 1:
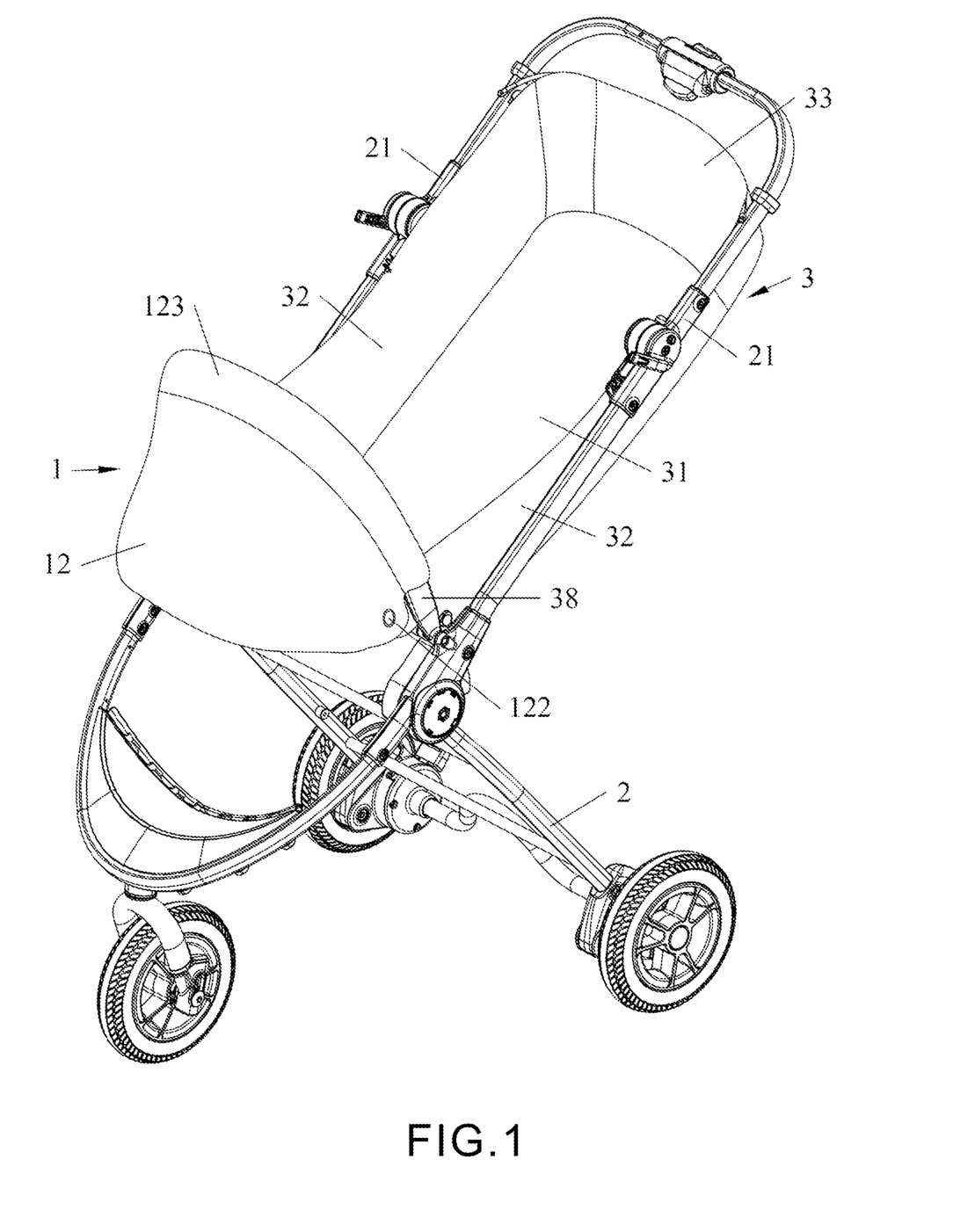
FIG. 1 is a perspective schematic view showing the seat baffle of the baby stroller when in use according to the present disclosure.
Figure 2:
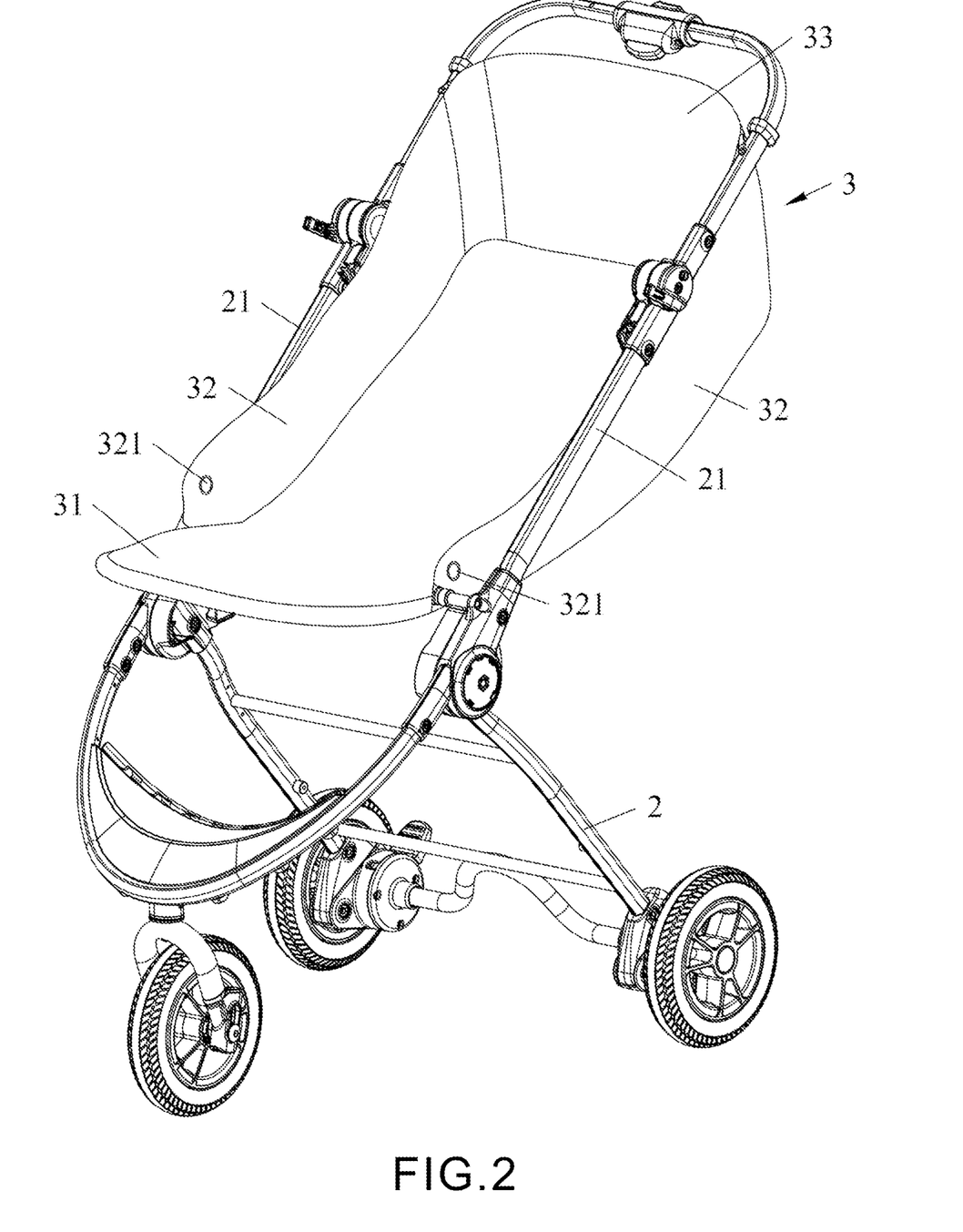
FIG. 2 is a perspective schematic view showing the seat baffle, after detachment, of the baby stroller according to the present disclosure.

Referring to FIG. 1 and FIG. 2, in the first embodiment of the present disclosure, a baby stroller with a seat baffle 1 is provided. The baby stroller includes a frame 2 and a baby carrier 3 disposed on the frame 2. The baby stroller 3 includes a seat 31, side blocks 32 disposed on both sides of the seat 31, and a rear block 33 disposed on a rear end of the seat 31. The front end of the baby carrier 3 is open, and the seat baffle 1 is disposed on the front end of the baby carrier 3. The baby carrier 3 further includes a support rod 38. The seat baffle 1 includes a baffle cloth 12. The support rod 38 is erected relatively to the seat 31 and straddles the front end of the seat 31. One end of the baffle cloth 12 is fixed to the front end of the seat 31, and the other end of the baffle cloth 12 can be detachably fixed to the support rod 38. As shown in FIG. 1, when the baffle cloth 12 is fixed on the support rod 38, the baffle cloth 12, when in use, is used for shielding the front end of the main body 3; at this time, the baby carrier 3 is a completely restricted structure for high safety. When the baffle cloth 12 is removed, as shown in FIG. 2, and the support rod 38 is removed, the seat baffle 1 is in a stored state; at this time, the baby carrier 3 is a structure with an open front end. In this embodiment, the baby carrier 3 is a cradle.

Figure 3:
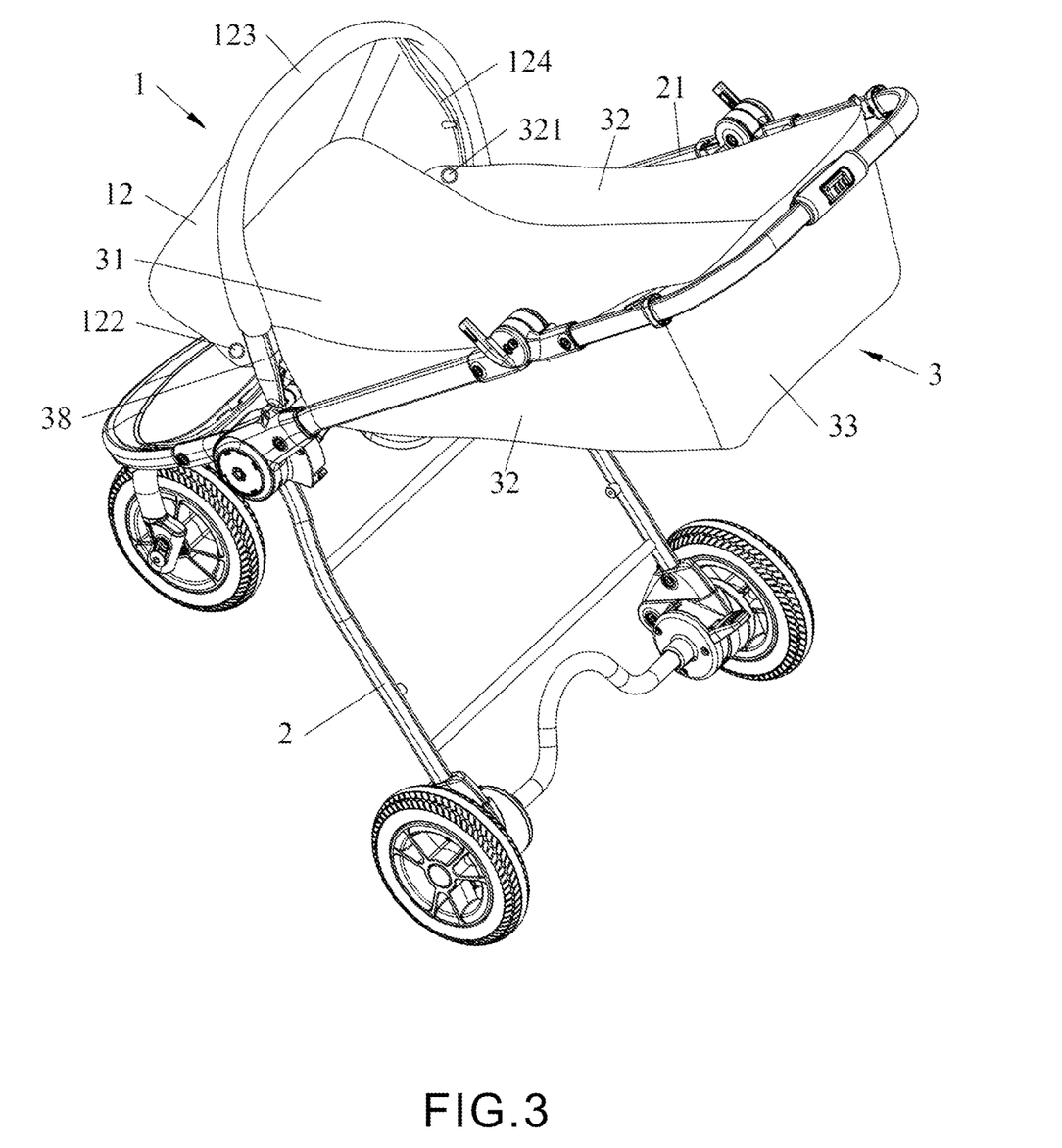
FIG. 3 is a perspective schematic view showing the baby stroller from another angle according to the present disclosure.

Based on FIG. 1 in combination with FIG. 3, when the seat baffle 1 is in use, the baffle cloth 12 is arc-shaped for shielding the front end of the main body 3 due to the support and limitation of the support rod 38. The two sides of the baffle cloth 12 are connected to the front ends of the side blocks 32 at both sides. A first connecting component 321 is disposed on each front end of the side blocks 32, and a second connecting component 122 is disposed at the corresponding position where the two sides of the baffle cloth 12 overlap with the side blocks 32. The first connecting component 321 and the second connecting component 122 are engaged so as to lock and stabilize the position of the baffle cloth 12. When the seat baffle 1 is not used, the first connecting component 321 and the second connecting component 122 must be disengaged first, and then the baffle cloth 12 can be removed from the front end of the main body 3. The first connecting component 321 and the second connecting component 122 are engaged with each other. In this embodiment, the first connecting component 321 and the second connecting component 122 are respectively a male button and a female button of press buttons, the male button and the female button are pressed toward each other hardly for engagement and fixation, and are pulled in the opposite direction for the separation. In addition to the press buttons, the first connecting component 321 and the second connecting component 122 can be two parts of a hook and loop tape, and fixed to each other via adhesion. In addition, the first connecting component 321 and the second connecting component 122 can be magnets, and they are fixed to each other by magnetic attraction. It should be pointed out that the baffle cloth is sufficient to properly shield the front end of the main body 3 only by the support of the support rod 38, and the design of the first connecting component 321 and the second connecting component 122 can result in the better effect, but it is not a necessary structure. The position where the first connecting component 321 is disposed is not limited to the side block 32, and the first connecting component 321 may also be disposed at other positions of the baby carrier 3.

Referring to FIG. 3, in this embodiment, the upper end of the baffle cloth 12 covers the support rod 38 to form a covering portion 123. This covering structure is beneficial to increase the contact area between the baffle cloth 12 and the support rod 38 to ensure the connection and support effect. Specifically, a zipper 124 is disposed on the upper end of the baffle cloth 12, and after the baffle cloth 12 covers the support rod 38, the zipper 124 is pulled up to fix the upper end of the baffle cloth 12 on the support rod 38. On the contrary, after the zipper 124 is opened, the baffle cloth 12 can be detached from the support rod 38. Certainly, the zipper 124 is not the only option to be used for fixing the baffle cloth. The hook and loop tape can be used for fixing the baffle cloth. Further, in other embodiments, the baffle cloth 12 may not cover the support rod 38, and for example, a hook is disposed at the end of the baffle cloth 12 to be hung on the support rod 38, as long as the two can be detachably fixed to each other.

Figure 4:
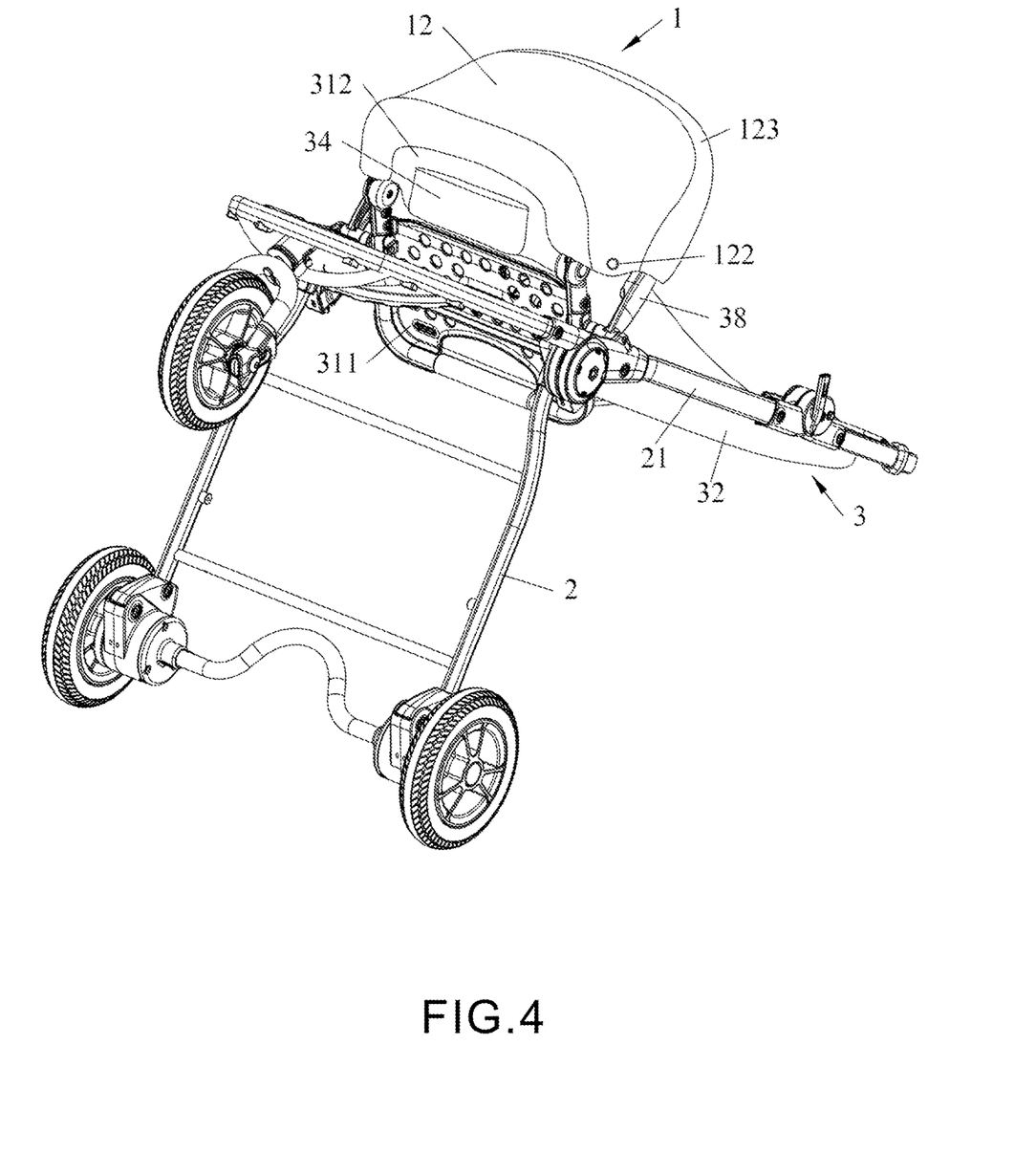
FIG. 4 is a perspective schematic view showing the bottom of the seat of the baby stroller according to the present disclosure.

Referring to FIG. 2 in combination with FIG. 4, the seat 31 includes a seat plate 311 and a seat cloth sleeved on the seat plate 311. Only the seat cloth can be seen from the angle shown in FIG. 2, and the seat cloth only covers the front part of the bottom surface of the seat plate 311. Thus, from the perspective of the bottom of the stroller in FIG. 4, the seat plate 311 exposed outside the bottom portion 312 of the seat cloth can be seen. The seat plate 311 is the main load-bearing structure of the main body 3 of the baby carrier 3, and can be a complete plate or composed of several rods. The seat cloth covers the seat plate 311 to increase softness and comfort. The seat plate 311 can also be composed of two plates that are pivotally connected to each other, and the two plates respectively carry the baby's buttocks and back, and can adapt to different sitting positions of the baby by adjusting the relative angle. Actually, the fixation of the above-mentioned baffle cloth 12 and the seat 31 is the fixation of the baffle cloth 12 and the bottom portion 312 of the seat cloth. Specifically, one end of the baffle cloth 12 is fixed to the bottom portion 312 of the seat cloth on the bottom surface of the front end of the seat 31 by sewing, and the baffle cloth 12 is turned up over the front end of the seat 31 and then fixed to the support rod 38. A storage bag 34 is disposed at the bottom surface of the seat 31. In this embodiment, the storage bag 34 is formed by sewing a piece of cloth to the bottom portion 312 of the seat cloth, and has an opening toward the front end of the seat 31.

Figure 5:
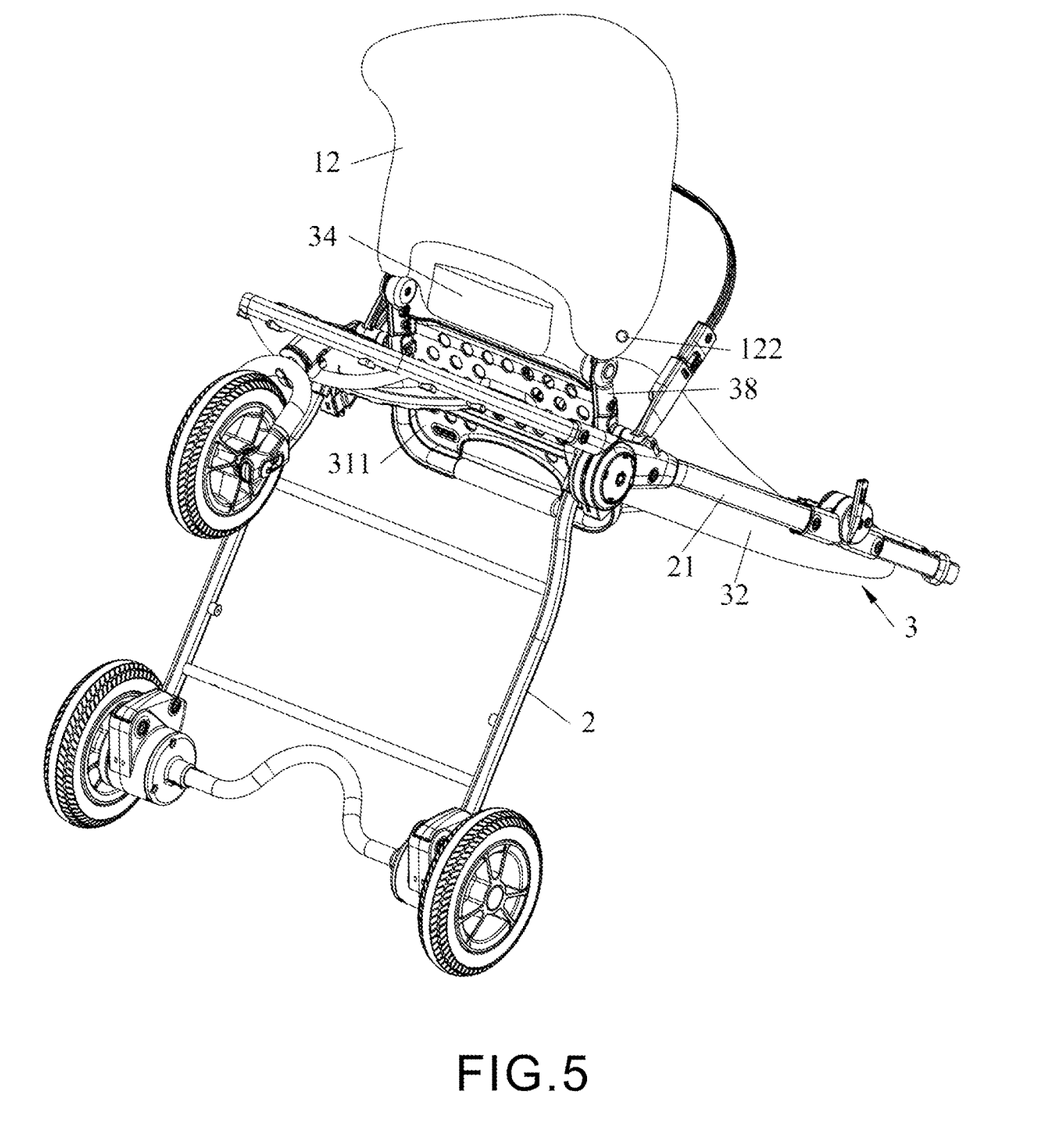
FIG. 5 is a perspective schematic view showing the baffle cloth after being detached from the support rod.
Figure 6:
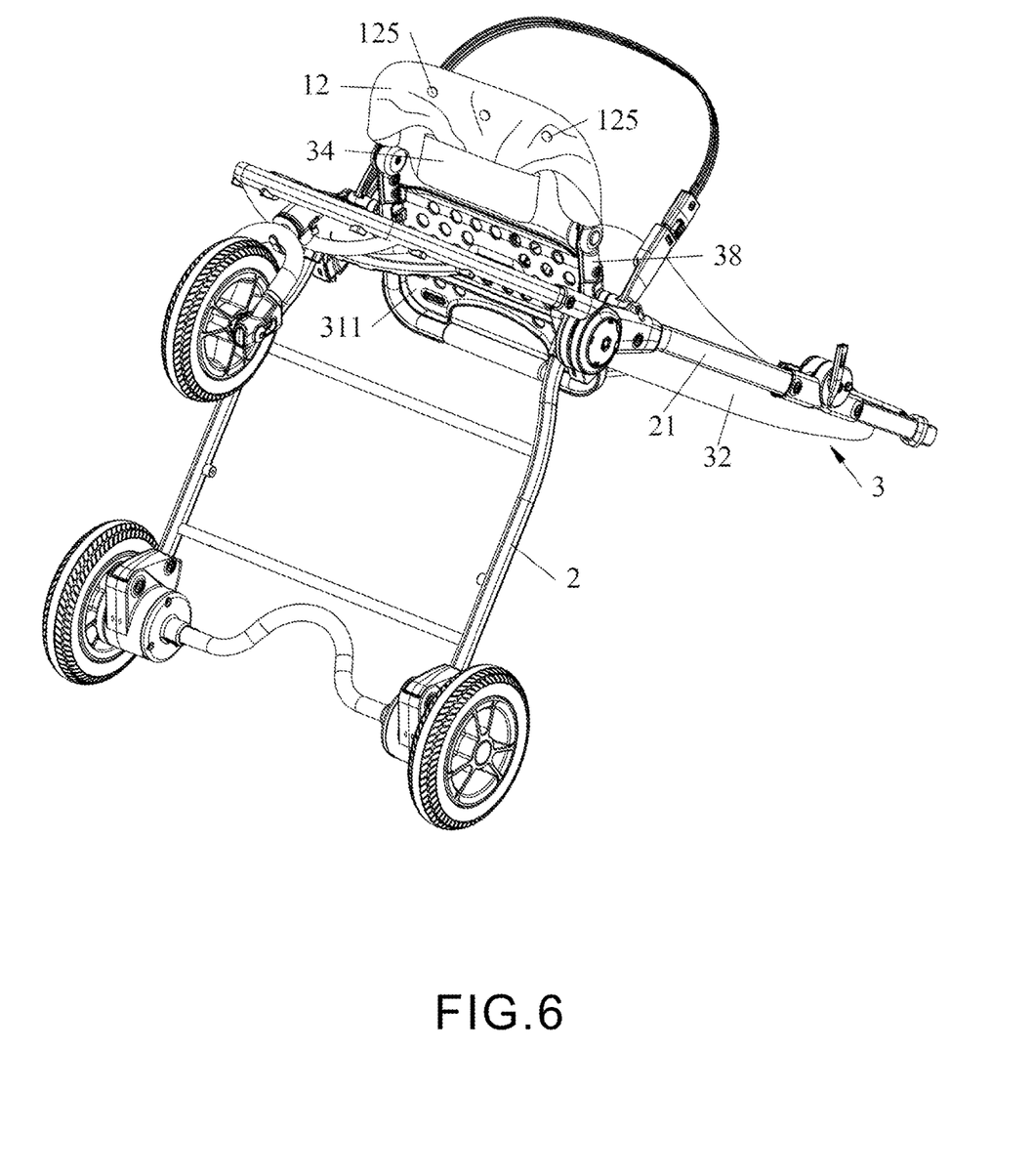
FIG. 6 is a perspective schematic view showing the baffle cloth received in the storage bag.

Referring to FIG. 5 and FIG. 6, when the seat baffle 1 of the seat is not used, the baffle cloth 12 is detached from the support rod 38, and then collected downward and received into the storage bag 34. If the baffle cloth 12 is not fixed to the seat 31 but is completely removed from the seat 31, the baffle cloth 12 needs to be stored separately, which may cause omission and loss. In this embodiment, one end of the baffle cloth 12 is fixed to the seat 31, and the storage bag 34 is disposed for receiving the baffle cloth 12, so as to avoid the loss of the baffle cloth 12 and to prevent the baffle cloth 12 from hanging outside and affecting the appearance of the stroller. Preferably, a plurality of third connecting components 125 are disposed in the middle of the baffle cloth 12, and a plurality of fourth connecting components (not shown) are disposed on the bottom surface of the seat 31. After the baffle cloth 12 is received in the storage bag 34, the third connecting components 125 and the fourth connecting components are engaged, such that the received baffle cloth 12 is firmer and will not accidentally fall out of the storage bag 34. The third connecting components 125 and the fourth connecting components may have the same structures as the first connecting component 321 and the second connecting component 122 described above.

Based on FIG. 6 in combination with FIG. 1, the baby stroller includes a frame 2 and a baby carrier 3 disposed on the frame 2. The baby carrier 3 includes a main body 2 and a seat baffle 1. The frame 2 includes two side bars 21, the main body 3 of the baby carrier 3 is disposed between the two side bars 21 in a conventional manner. The support rod 38 of the seat baffle 1 has a U-shaped structure, and its two ends are respectively mounted and fixed on the inner sides of the two side bars 21. In this embodiment, the two ends of the support rod 38 can be detachably mounted and locked at the two side bars 21 by a locking mechanism. The support rod 38 can be unlocked and removed from the support rod 38 by unlocking the locking mechanism. When the baffle cloth 12 is received and the support rod 38 is not removed, the support rod 38 can be used as an armrest. After the support rod 38 is removed, the front end of the baby carrier 3 is more open, and the baby can move more freely. The remaining structure of the baby stroller has nothing to do with the technology of the present disclosure, so it is omitted.

Figure 7:
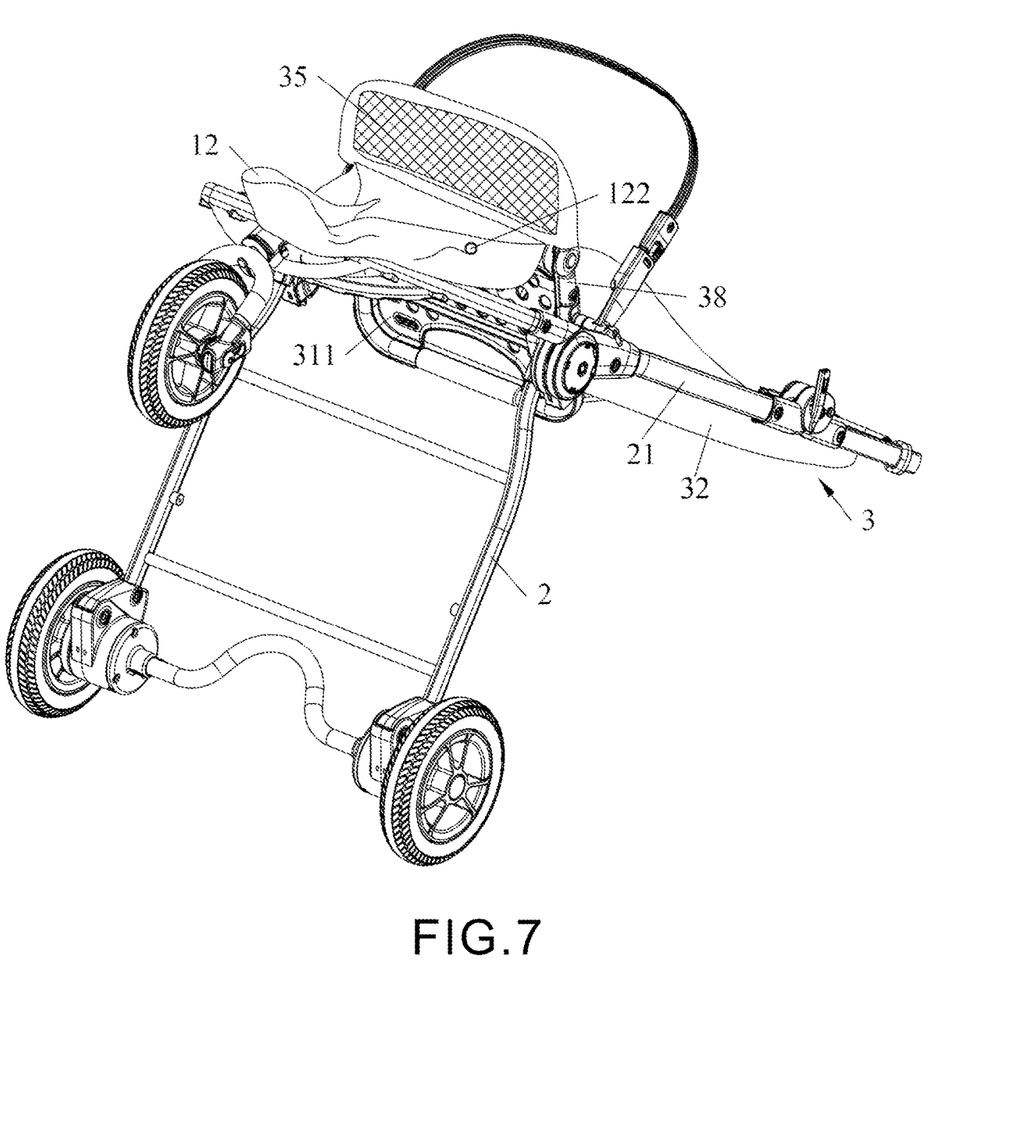
FIG. 7 is a perspective schematic view showing the storage bag according to the second embodiment of the present disclosure.
Figure 8:
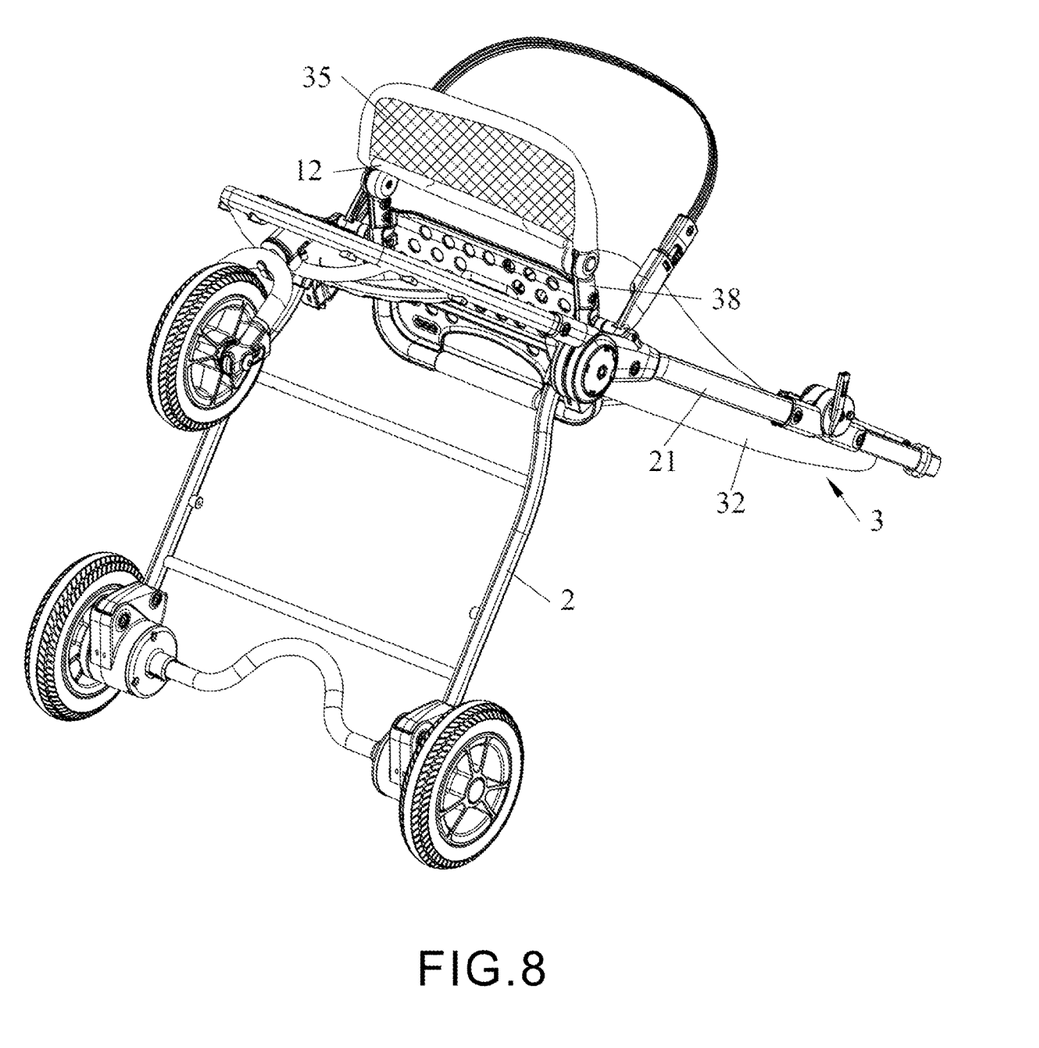
FIG. 8 is a perspective schematic view showing the baffle cloth received in the storage bag according to the second embodiment of the present disclosure.
Figure 9:
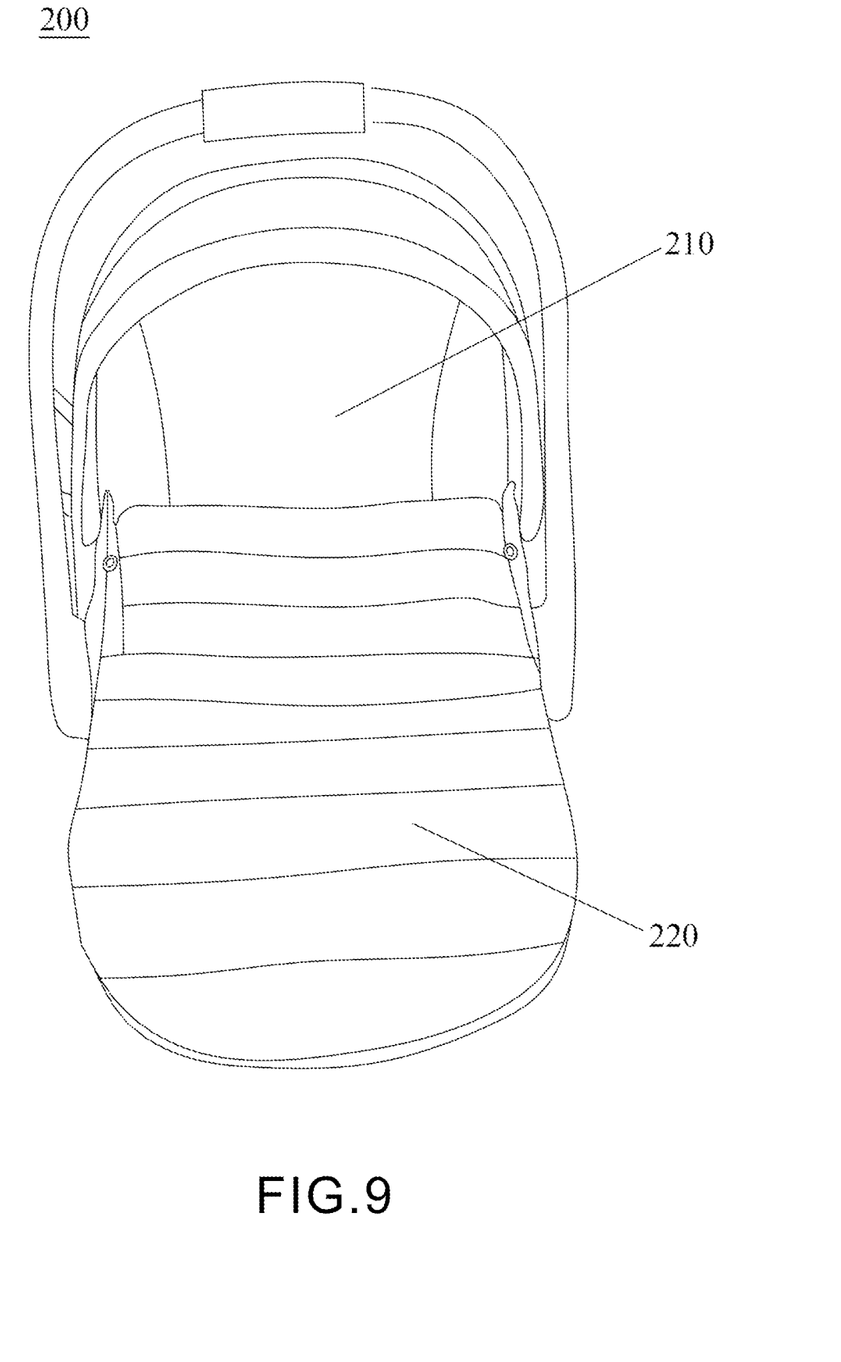
FIG. 9 is a perspective schematic view showing the baby carrier according to another embodiment of the present disclosure.

FIG. 7 and FIG. 8 show the second embodiment of the present disclosure. In this embodiment, the storage bag 35 is a part of the seat cloth, and is made of an elastic material. After the seat cloth is made of cloth or elastic material, the seat cloth is sleeved on the seat plate 311, such that the storage bag 35 is located on the bottom surface of the seat 31. In this embodiment, the storage bag 35 has elasticity, so the baffle cloth 12 received therein can be compacted by the elastic force, and there is no need to provide other structures to restrict the baffle cloth 12 from coming out.

In the present disclosure, although "baffle cloth" and "seat cloth" contain the word "cloth" in their names, they are not restricted to only be cloth materials, and any other soft material that can be used on a stroller with the same function can be used as "baffle cloth" and "seat cloth".

In comparison with the conventional technologies, the front end of the main body 3 of the baby carrier in the present disclosure is open, the seat baffle 1 is disposed on the front end of the main body, one end of the baffle cloth 12 is fixed to the seat 31, and the other end of the baffle cloth 12 is detachably fixed to the support rod 38. When the baffle cloth 12 is fixed on the support rod 38, the front end of the main body 3 is shielded; at this time, the baby carrier 3 is a completely restricted structure, which can be used for babies less than 6 months old or small in size. When the baffle cloth 12 is detached from the support rod 38, the front end of the main body 3 is not shielded by the baffle cloth 12 and becomes open; at this time, the baby carrier 3 is can be used for babies older than 6 months or big in size. In comparison with the conventional technologies, the seat baffle 1 of the present disclosure can be switched between two usage statuses in the baby carrier 3, such that the baby carrier 3 can be used for babies of different sizes, which is beneficial to improve the applicability of the stroller, and thus saves family consumption expenditure, reduces waste of resources, and reduces pollution to the environment. Also, since the seat baffle 1 is disposed on the baby carrier 3 of the baby stroller in the present disclosure, the seat baffle 1 can be switched between the two usage statues, i.e. shielding the front end of the main body 3 of the baby carrier 3 and being removed, so that the baby stroller of the present disclosure can be applied to babies of different sizes.

As shown in FIG. 9 to FIG. 12, the present disclosure provides another structure of a baby carrier.

In this embodiment, the baby carrier is a baby car seat 200, suitable for infants from 0 to 12 months old. The baby car seat 200 includes a seat 210 and a baffle cloth 220 for shielding an upper end of the seat 210. One end of the baffle cloth 220 is connected to and front end of the seat 210, and the other end of the baffle cloth 220 is detachably disposed at a lateral surface of the seat 210. A storage bag 211 is disposed at one side of the seat 210, and the baffle cloth 220 can be received in the storage bag 211 after being detached from the seat 210.

Figure 10:
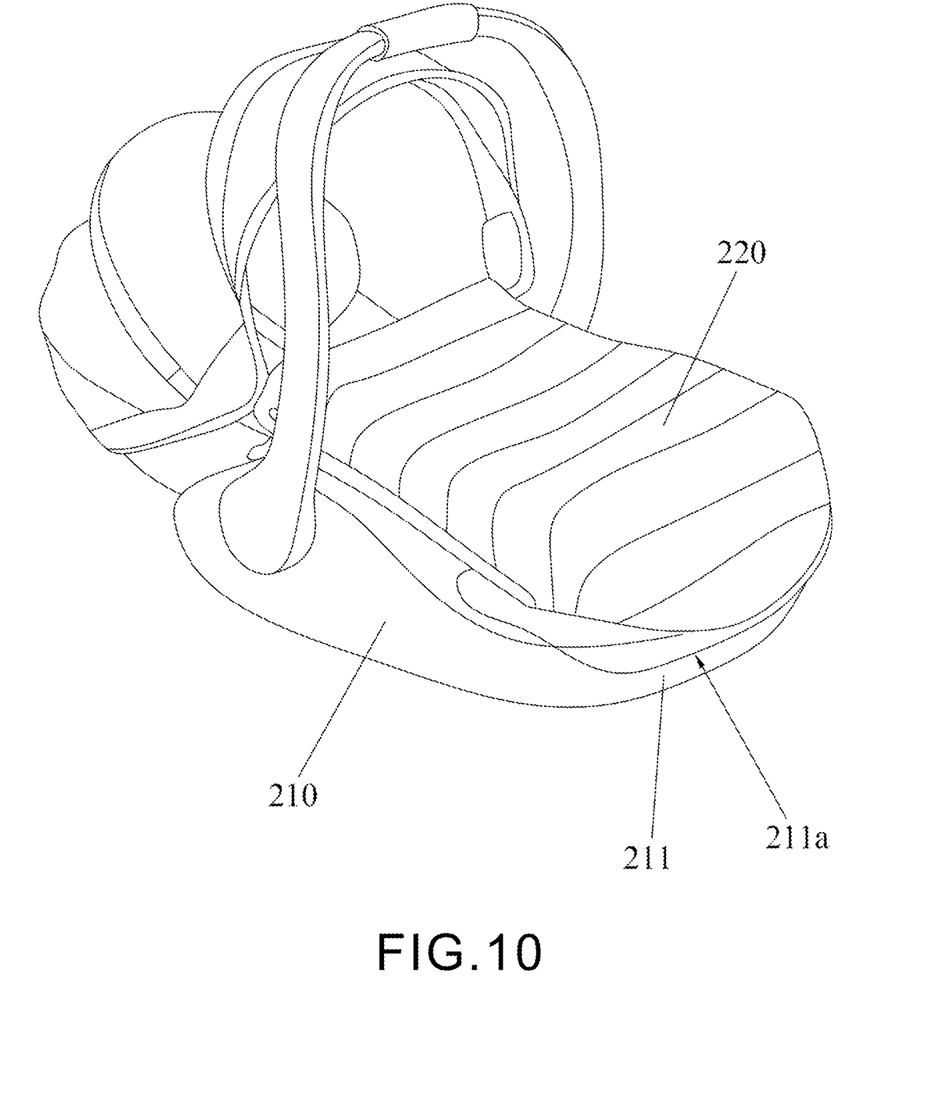
FIG. 10 is a perspective schematic view showing the baby carrier from another angle according to another embodiment of the present disclosure.
Figure 11:
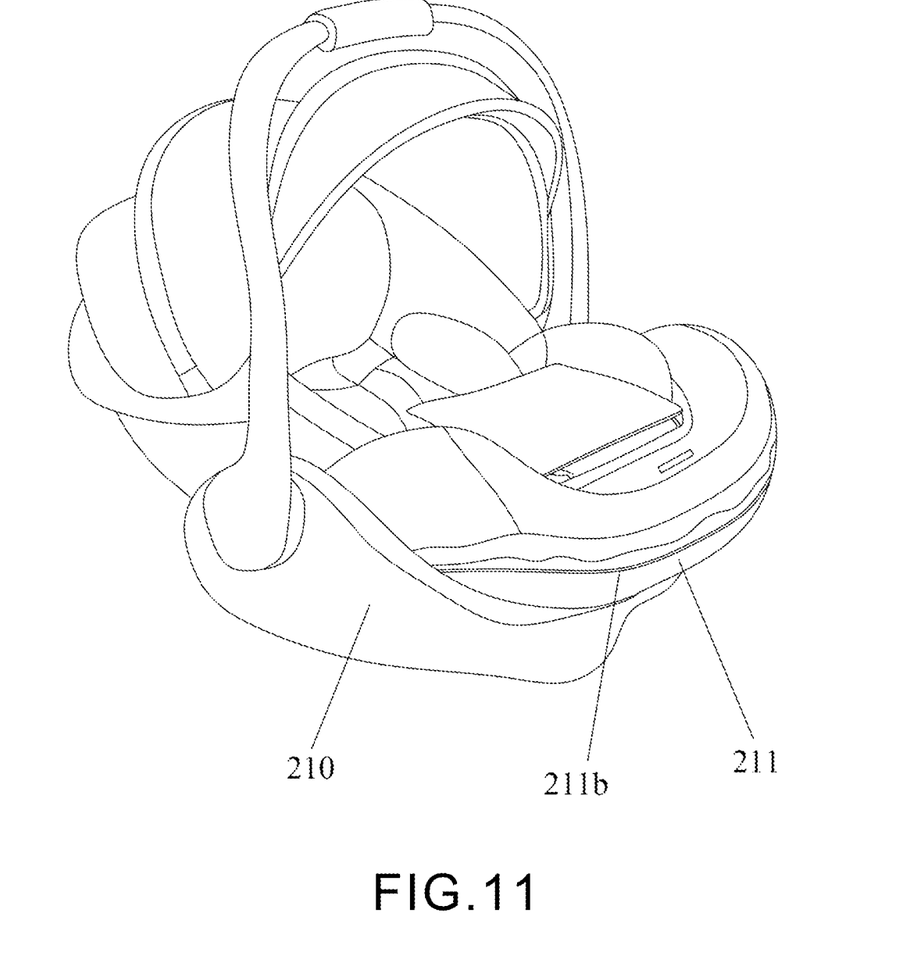
FIG. 11 is a perspective schematic view showing the baby carrier with the baffle cloth removed according to another embodiment of the present disclosure.

Referring to FIG. 10 and FIG. 11, the storage bag 211 is disposed on the front end of the seat 210. The upper end of the storage bag has an opening 211a. One end of the baffle cloth 220 can be detachably connected to the inside of the storage bag 211, such that the baffle cloth 220 can be quickly opened when in use, which improves the convenience of use, and can quickly store the baffle cloth 220 when not in use so as to prevent the baffle cloth 220 from being lost. Certainly, one end of the baffle cloth 220 cannot be connected to the inside of the storage bag 211. A zipper 211b can be disposed at the opening 211a of the storage bag 211 for closing or opening the opening. By providing the zipper 211b, when the baffle cloth 220 is received in the storage bag 211, the zipper 211b can close the opening 211a, thereby preventing the baffle cloth 220 from protruding outwards and improving the appearance of the entire seat. A shielding sheet 212 is disposed at a side surface of the seat 210 for shielding the zipper 211b. This can further improve the appearance of the entire seat.

Figure 12:
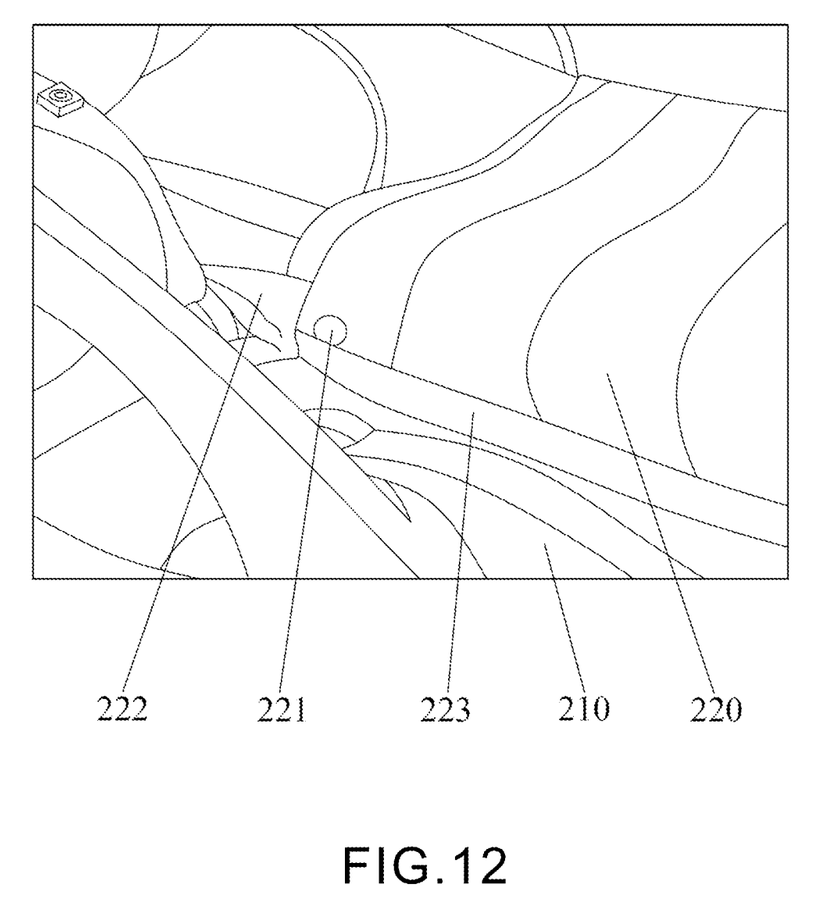
FIG. 12 is a partial enlarged view of the baby carrier according to another embodiment of the present disclosure.

As shown in FIG. 12, a first connecting component 221 and a second connecting component (not shown) are disposed at both sides of the baffle cloth 220, and the first connecting component 221 and the second connecting component are engaged to lock the position of the baffle cloth 220. Specifically, a webbing 222 is disposed at two sides of the baffle cloth 220, and the second connecting component is disposed on the webbing 222. The first connecting component 221 and the second connecting component are respectively a male button and a female button of press buttons. When the webbing passes around the seat, the first connecting component 221 and the second connecting component can be engaged to position the baffle cloth 220 on the seat 210. In this way, the baffle cloth 220 can be quickly and conveniently operated when attaching to or detaching from the baby carrier, and the convenience of use can be improved. In addition, an edge of the baffle cloth 220 is provided with an elastic band 223 to prevent the edge of the baffle cloth 220 from turning outward.

In comparison with the conventional technologies, in this embodiment, the baffle cloth of the baby car seat, when in use, can shield the front end of the baby car seat, and the baffle cloth 220 can be stored when not in use. This has two usage statuses in the baby carrier, such that the baby carrier can be used for babies of different sizes, which is beneficial to improve the applicability of the baby stroller.

The present invention has been disclosed in preferred embodiments above. The above-mentioned embodiments should not be construed as limiting the scope of the present invention. It should be noted that all changes and substitutions equivalent to the above-mentioned embodiments should be included in the scope of the present invention.

What is claimed is:

1. A seat baffle arranged in a baby carrier which comprises a seat and a support rod erected relatively to the seat and straddling a front end of the seat, wherein the seat comprises a seat plate and a seat cloth sleeved on the seat plate, the seat baffle comprising:
   a baffle cloth, having one end fixed to the seat cloth on the front end of the seat, and having the other end detachably fixed to the support rod to cover a front end of the baby carrier,
   wherein a storage bag is disposed at a bottom surface of the seat, and wherein the baffle cloth surrounds and wraps the front end of the seat and is received into the storage bag after being separated from the support rod.

2. The seat baffle of claim 1, wherein the one end of the baffle cloth is fixed to a bottom surface of the front end of the seat.

3. The seat baffle of claim 1, wherein the baffle cloth is sewn and fixed to the seat cloth.

4. The seat baffle of claim 1, wherein the baby carrier comprises a first connecting component, and the baffle cloth comprises a second connecting component for locking a position of the baffle cloth when the second connecting component is coupled with the first connecting component.

5. The seat baffle of claim 4, wherein the baby carrier further comprises side blocks disposed on both sides of the seat and a rear block fixed to a rear end of the seat, and the first connecting components are disposed on the side block.

6. The seat baffle of claim 4, wherein the first connecting component and the second connecting component are engaged with each other.

7. The seat baffle of claim 6, wherein the first connecting components and the second connecting components are a male button and a female button of press buttons.

8. The seat baffle of claim 1, wherein a plurality of third connecting components are disposed on the baffle cloth, a plurality of fourth connecting components are disposed on the bottom surface of the seat, and the third connecting components and the fourth connecting components are engaged after the baffle cloth is received in the storage bag.

9. The seat baffle of claim 1, wherein the storage bag is a mesh structure made of an elastic material.

10. The seat baffle of claim 1, wherein the support rod is covered by one end of the baffle cloth.

11. The seat baffle of claim 10, wherein one end of the baffle cloth comprises a zipper, and the baffle cloth covers the support rod and is fixed to the support rod by the zipper.

12. The seat baffle of claim 1, wherein the support rod is detachably disposed near the front end of the seat.

13. A baby stroller having a frame and a baby carrier disposed on the fame, wherein the baby carrier is provided with the seat baffle according to claim 1.

14. The baby stroller of claim 13, wherein the frame comprises two side bars, and the baby carrier is disposed between the two side bars.

15. The baby stroller of claim 14, wherein two ends of the support rod are detachably mounted on the two side bars, respectively.

* * * * *